United States Patent
Hoetzer et al.

(10) Patent No.: US 7,174,980 B2
(45) Date of Patent: Feb. 13, 2007

(54) METHOD FOR CONTROLLING THE OPERATING RESPONSE OF A HYBRID DRIVE OF A VEHICLE

(75) Inventors: Dieter Hoetzer, Schwieberdingen (DE); Juergen Loeffler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 170 days.

(21) Appl. No.: 10/470,219

(22) PCT Filed: Sep. 24, 2002

(86) PCT No.: PCT/DE02/03602

§ 371 (c)(1),
(2), (4) Date: Dec. 16, 2003

(87) PCT Pub. No.: WO03/045725

PCT Pub. Date: Jun. 5, 2003

(65) Prior Publication Data

US 2004/0084231 A1    May 6, 2004

(30) Foreign Application Priority Data

Nov. 24, 2001    (DE) ............................... 101 57 669

(51) Int. Cl.
*B60W 20/00* (2006.01)

(52) U.S. Cl. .................. 180/65.4; 180/65.2; 180/65.8; 903/942; 903/945

(58) Field of Classification Search .............. 180/65.2, 180/65.3, 65.4, 65.6, 65.7; 903/941, 942, 903/947

See application file for complete search history.

(56) References Cited

U.S. PATENT DOCUMENTS

| 4,335,429 A * | 6/1982 | Kawakatsu .................. 701/102 |
| 5,461,289 A | 10/1995 | Adler et al. |
| 6,281,646 B1 * | 8/2001 | Masberg et al. ............. 318/139 |
| 6,480,767 B2 * | 11/2002 | Yamaguchi et al. ........... 701/22 |
| 6,500,089 B2 * | 12/2002 | Lasson et al. .................. 477/3 |
| 6,554,088 B2 * | 4/2003 | Severinsky et al. ......... 180/65.2 |
| 6,629,026 B1 * | 9/2003 | Baraszu et al. ................ 701/22 |
| 6,809,429 B1 * | 10/2004 | Frank ........................ 290/40 C |

FOREIGN PATENT DOCUMENTS

| DE | 196 50 570 | 6/1998 |
| DE | 198 02 480 | 8/1999 |
| DE | 199 58 403 | 6/2001 |
| DE | 100 25 037 | 11/2001 |
| EP | 0 729 858 | 9/1996 |
| JP | 6055941 | 3/1994 |

* cited by examiner

*Primary Examiner*—Jeff Restifo
(74) *Attorney, Agent, or Firm*—Kenyon & Kenyon LLP

(57) ABSTRACT

A method of controlling the operating response of a hybrid drive of a vehicle is described, the hybrid drive having an internal combustion engine and at least one electric motor as the drive motors, and the drive shafts of the drive motors being mechanically linkable to a drive train of the vehicle. A drag torque characteristic curve for the hybrid drive is established by targeted activation of the at least one electric motor.

12 Claims, 4 Drawing Sheets

METHOD FOR CONTROLLING THE OPERATING RESPONSE OF A HYBRID DRIVE OF A VEHICLE

FIELD OF THE INVENTION

The present invention relates to a method for controlling the operating response of a hybrid drive of a vehicle, the hybrid drive including an internal combustion engine and at least one electric motor as the drive motors, and the drive shafts of the drive motors being functionally connectable to a drive train of the vehicle.

BACKGROUND INFORMATION

Hybrid drives for vehicles are known. In the hybrid drives claimed here, an internal combustion engine is combined with at least one electric motor so that multiple drive sources are provided for the vehicle. According to the requests specified by a vehicle driver, the drive sources can optionally supply their drive moments to a drive train of the vehicle. Depending on the actual driving situation, this results in various drive configuration possibilities for the drive, in a manner known as such, which in particular are used for improving driving comfort and reducing energy use as well as pollutant emissions.

In hybrid drives for vehicles, serial configurations, parallel configurations, and mixed configurations of an internal combustion engine and electric motors are known. Depending on the configuration, the electric motors may be directly or indirectly coupled to the drive train of the internal combustion engine. For the mechanical linkage of the internal combustion engine and/or the electric motors, it is known to provide these with a mechanically linkable configuration via gearing, for example planetary gears or the like, and clutches.

It is known that the internal combustion engine functions as the main drive source for the vehicle, while the electric motors, depending on the actual driving situation, may be engaged or disengaged. In drive designs it is known that for a negative torque request by a vehicle driver the internal combustion engine delivers a drag torque which is determined by the internal losses in the internal combustion engine as a function of an instantaneous engine rotational speed. If the gears are changed during the negative torque requests by the vehicle driver, for example in the operation of a manual transmission or actuation of a hydrodynamic converter (automatic transmission), abrupt variations in the output torque of the drive result on account of the abrupt change in the rotational speed acting on the drive train (corresponding to the gear position selected). This is caused by the fact that the drag torque of the internal combustion engine is a function of the rotational speed.

SUMMARY OF THE INVENTION

The method according to the present invention, in contrast, offers the advantage that the drag torque is independent of the engine rotational speed of the internal combustion engine when the vehicle driver requests a negative torque (drag torque). By establishing a drag torque characteristic curve for the hybrid drive through a targeted activation of the at least one electric motor of the hybrid drive, it is advantageously possible to influence in a targeted manner a drag torque characteristic curve of the hybrid drive as a function of the vehicle speed. By activating the at least one electric motor, the drag torque of the internal combustion engine may be compensated for in whole or in part, or an additional drag torque may be generated by operating the electric motor in generator mode.

In particular, by disengaging the internal combustion engine from the drive train, by engaging the clutch, for example, drag torques may be applied solely by the at least one electric motor, thereby establishing a drag torque response for the vehicle to which the vehicle driver is accustomed. In each case, an abrupt response of the drag torque characteristic curve of the internal combustion engine, and thus of the hybrid drive, may be compensated for by the resulting variations in the activation of the electric motor.

In one preferred embodiment of the present invention, a so-called coasting operation of the hybrid drive is achieved without disengaging the internal combustion engine from the drive train. The drag torque applied by the internal combustion engine is compensated for by activating the at least one electric motor in such a way that the drag torque of the internal combustion engine is exactly compensated for by a positive torque of the at least one electric motor. The vehicle is then decelerated solely by the drive resistance acting on the vehicle.

In addition, in one preferred embodiment of the present invention it is possible to vary the drag torque characteristic curve as a function of a braking request of a vehicle driver by the targeted activation of the at least one electric motor. This enables braking support to be easily provided by increasing a drag torque of the hybrid drive.

DETAILED DESCRIPTION

Figure 1:
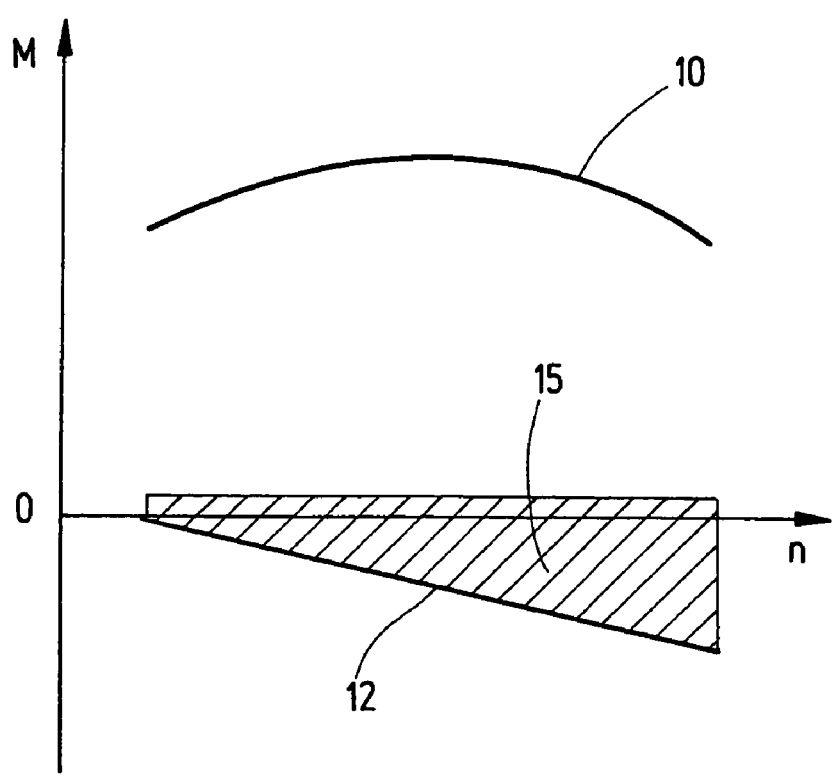
FIG. 1 shows a torque characteristic curve of an internal combustion engine.

FIG. 1 shows for illustrative purposes a torque characteristic curve of an internal combustion engine as a function of the rotational speed. A maximum torque characteristic curve 10 for a power request by a vehicle driver is illustrated, as well as a drag torque characteristic curve 12 for a negative power request by the vehicle driver. A negative power request is present when the vehicle driver does not actuate the gas pedal of the vehicle; i.e., the gas pedal is at or approximately at the zero position. Based on characteristic curve 12 in FIG. 1, it is apparent that in this operating mode of the vehicle, drag torque characteristic curve 12 is established as a function of engine rotational speed n. The higher the engine rotational speed n, the higher the drag torque. The drag torque is negative with respect to the output torque of the internal combustion engine, and in particular is a function of internal losses in the internal combustion engine, in particular friction and the like. Above drag torque characteristic curve 12 a region 15 is designated which cannot be adjusted by activating the internal combustion engine, for example, for non-Diesel internal combustion engines, a region which cannot be adjusted by positioning a throttle valve or specifying an ignition angle, and for Diesel engines, a region which cannot be adjusted by a fuel injection quantity. It is clear that an operating point of the internal combustion engine is defined by engine rotational speed n and torque M, the upper limit being bounded by maximum torque characteristic curve 10 and the lower limit being bounded by drag torque characteristic curve 12.

Figure 2:
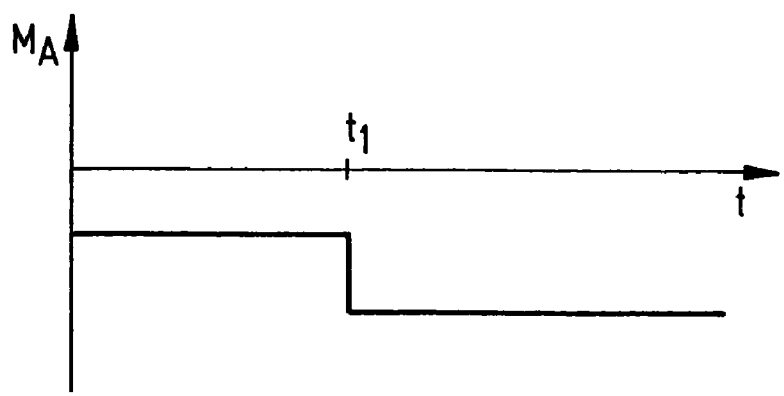
FIG. 2 shows the variation of an output torque of a vehicle.

FIG. 2 illustrates an output torque $M_A$ as a function of time t. It is assumed here that at a time $t_1$ a transmission mechanically linked to the internal combustion engine is switched, for example by manual or automatic shifting, resulting in an abrupt change in output torque $M_A$ when a negative torque on the internal combustion engine is requested by a vehicle driver. This abrupt change in output torque $M_A$ acts on the drive wheels of the vehicle and results in impaired driving comfort.

Figure 3:
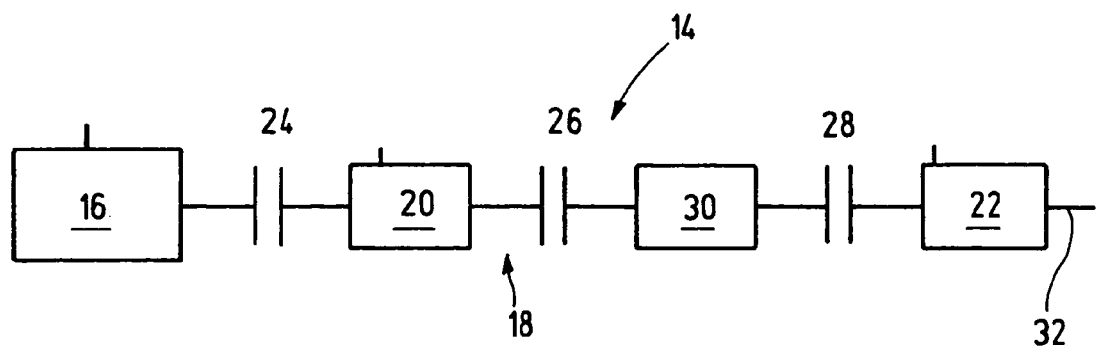
FIG. 3 schematically shows a hybrid drive of a vehicle.

FIG. 3 schematically illustrates a hybrid drive 14 of a vehicle which includes an internal combustion engine 16 having the characteristic curves illustrated in FIGS. 1 and 2. FIG. 3 illustrates a parallel hybrid drive in which a drive train 18 includes at least one, in this case two, electric motors 20 and 22 in addition to internal combustion engine 16. Drive train 18 includes clutches 24, 26, and 28 and transmission 30. By engaging clutches 24, 26, and/or 28 and activating internal combustion engine 16 or electric motor 20 and/or 22, it is possible to establish a selectable output torque on drive shaft 32 of drive train 18. The structure and operating principle of such parallel hybrid drives 14 are generally known, so that further detail is not provided within the scope of the present description.

Figure 4:
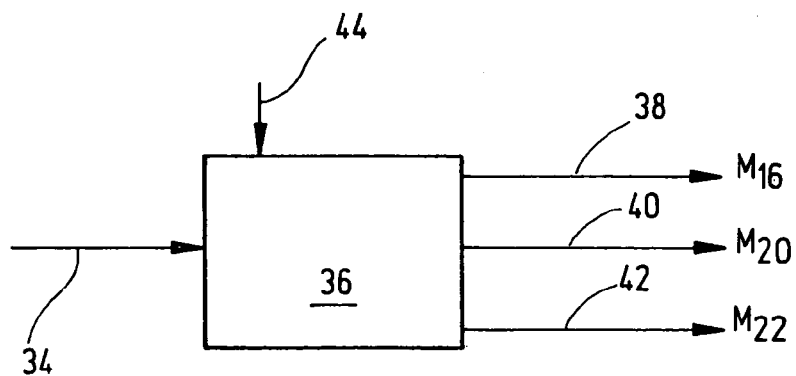
FIG. 4 shows a block diagram of the influence on the drag torque of the hybrid drive.

FIG. 4 shows once more, in a block diagram, the possibility of influencing the drag torque of the configuration shown in FIG. 3. It is assumed that a negative torque request by a vehicle driver is present; i.e., the gas pedal is at or approximately at the zero position. This negative torque request 34 is fed to a drag torque coordinator 36. Drag torque coordinator 36 may be formed from a circuit system, not shown in detail, which for example is a component of a control unit (motor control unit) of hybrid drive 14. Drag torque coordinator 36 sends control signals 38, 40, and 42. Control signals 38, 40, and 42 activate internal combustion engine 16 or electric motors 20 and 22 in such a way that these signals request a defined torque $M_{16}$, $M_{20}$, or $M_{22}$ which act on drive train 18. In the example shown, two electric motors 20 and 22 are assumed, it being clear that the number of electric motors may be greater or smaller, so that a corresponding number of control signals for electric motors 20 and 22 is provided by drag torque coordinator 36. A control signal 44 is also fed to drag torque coordinator 36 which corresponds to the instantaneous gear ratio of transmission 30, and thus to its gear position.

FIG. 5a illustrates once again drag torque characteristic curve 12 for internal combustion engine 16, clearly showing the dependency of the characteristic curve on rotational speed n.

Figures 5A, 5B:
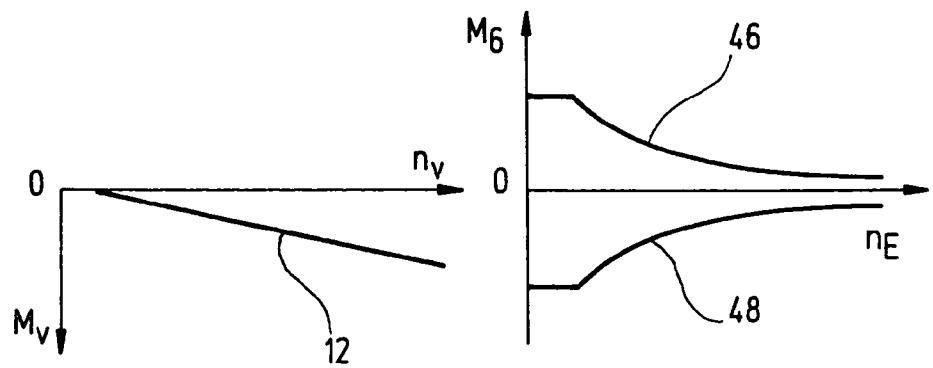
FIG. 5a shows a first view of the drag torque characteristic curve of drive sources for the hybrid drive.
FIG. 5b shows a second view of the drag torque characteristic curve of drive sources for the hybrid drive.

FIG. 5b shows the maximum and minimum possible torque characteristic curves 46 and 48, respectively, of an electric motor as a function of rotational speed $n_E$ of the electric motor. Rotational speed $n_E$ of the electric motor is a function of the supply voltage, for example, so that rotational speed $n_E$ of electric motors 20 and 22, and thus their torque $M_E$, may be readily controlled by signals 40 and 42 (FIG. 4).

Based on FIGS. 5a and 5b, it is apparent that it is possible to establish a resulting drag torque characteristic curve for hybrid drive 14 by superimposing the torque characteristic curve of internal combustion engines 16 and the torque characteristic curves of electric motors 20 and 22. When clutches 24, 26, and 28 are engaged, the sum of superimposed torques $M_V$ or $M_E$ is the maximum achievable drag torque of hybrid drive 14. The dependency of the torques on rotational speed $n_V$ or $n_E$ results in a dependency on instantaneous vehicle speed v.

FIG. 6 clarifies once again a superimposition of drag torque characteristic curve 12 for internal combustion engine 16 on the respective maximum or minimum torque characteristic curves 46, 46' and 48, 48' of electric motors 20 or 22, respectively. In each case the torques are plotted as a function of vehicle speed v. Drag torque characteristic curve 12 is plotted as a characteristic curve family (dash-dot-dash-line), the various drag torque characteristic curves 12 resulting from the instantaneous engaged mode of transmission 30. Five drag torque characteristic curves 12 are plotted in FIG. 6, assuming a 5-speed manual transmission 30. The maximum torque characteristic curves of electric motors 20 and 22 are represented by 46 and 46', respectively, and the minimum torque characteristic curves of electric motors 20 and 22 are represented by 48 and 48', respectively.

Corresponding to the engagement of clutches 24, 26, and 28, various possibilities are selected for influencing the overall drag torque of hybrid drive 14 by internal combustion engine 16 or electric motors 20 and 22. The following possibilities result, for example:

1. Clutch 28 is disengaged, so that the drag torque is determined solely by electric motor 22.
2. Clutches 28 and 26 are engaged and clutch 24 is disengaged, so that the drag torque of hybrid drive 14 is determined by electric motors 20 and 22.
3. Clutches 24, 26, and 28 are each engaged, so that the drag torque of the hybrid drive is determined by electric motors 20 and 22 as well as by internal combustion engine 16.

It is clear that various superimpositions of drag torque characteristic curve 12 of internal combustion engine 16 are possible as a function of the activations of clutches 24, 26, and 28 and of electric motors 20 and 22. When clutch 24 is disengaged, a so-called coasting operation of hybrid drive 14 is initiated, in this case it still being possible to influence the drag torque by electric motors 20 and 22.

Figure 6:
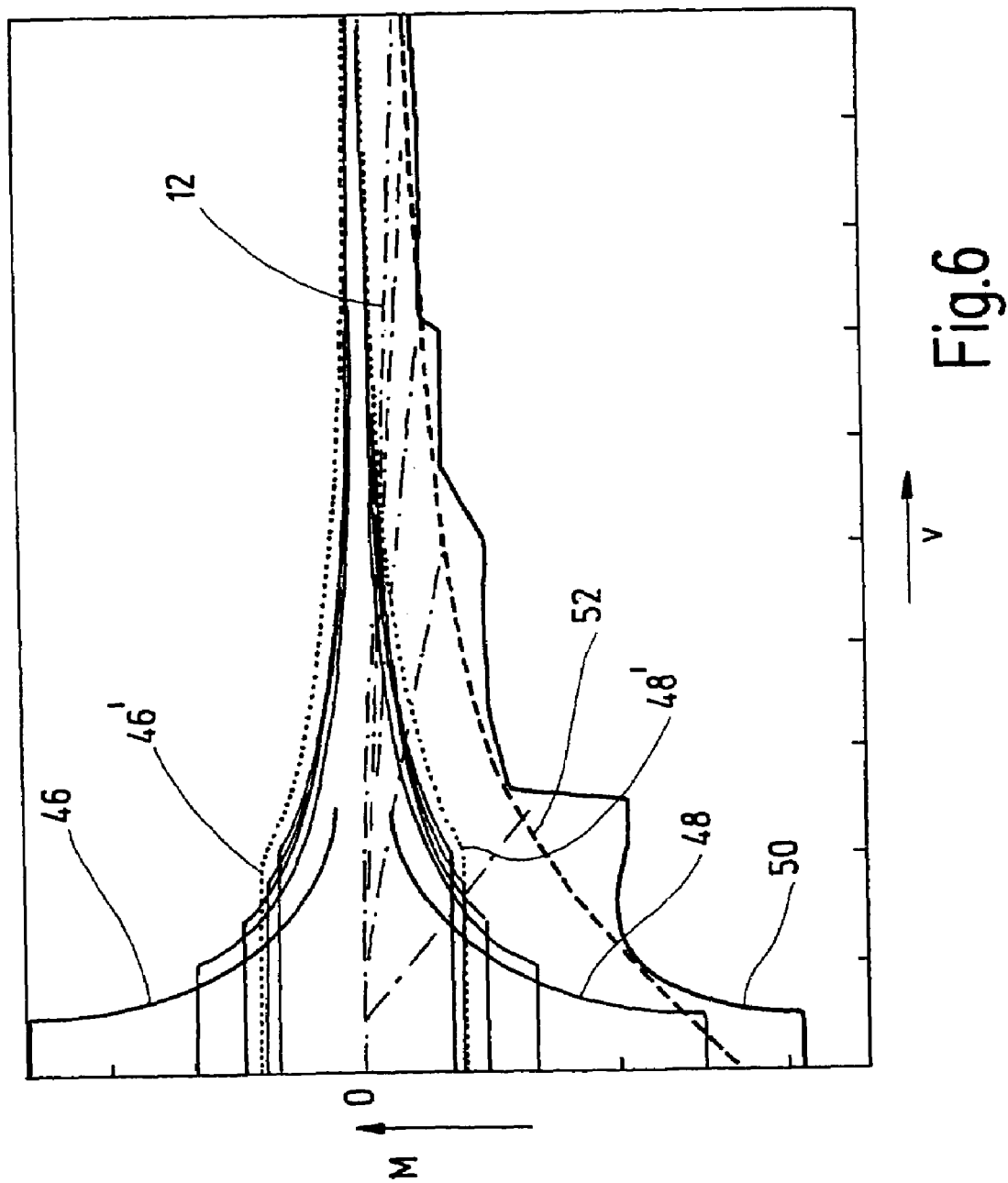
FIG. 6 shows various drag torque characteristic curves of the hybrid drive.

In FIG. 6, the maximum possible drag torque characteristic curve of hybrid drive 14 is denoted by reference number 50. This results when drag torque characteristic curve 12 of the internal combustion engine is superimposed on minimum torque characteristic curves 48 and 48' of electric motors 20 and 22. As shown in FIG. 6, this maximum possible drag torque characteristic curve 50 exhibits discontinuities as a function of vehicle speed v. For this reason a continuous drag torque characteristic curve 52 is selected by drag torque coordinator 36, which is maximally matched to maximum possible drag torque characteristic curve 50. This selected drag torque characteristic curve 52 is obtained by storing control signals 38, 40, and 42 for internal combustion engine 16 or electric motors 20 and 22 in drag torque coordinator 52 for each vehicle speed v as a function of the gear position of transmission 30 (signal 44). Electric motors 20 and 22 may be operated in engine mode or generator mode within their maximum or minimum characteristic curves 46, 48, respectively, so that it is possible to set drag torque characteristic curve 52 for hybrid drive 14 by the resulting superimposition of characteristic curves.

Of course, other drag torque characteristic curves 52 may be selected by executing appropriate routines. Drag torque coordinator 36 may optionally be provided with a characteristic map control which enables various drag torques to be set as a function of additional operating parameters of the vehicle for the same vehicle speeds v.

Figure 7:
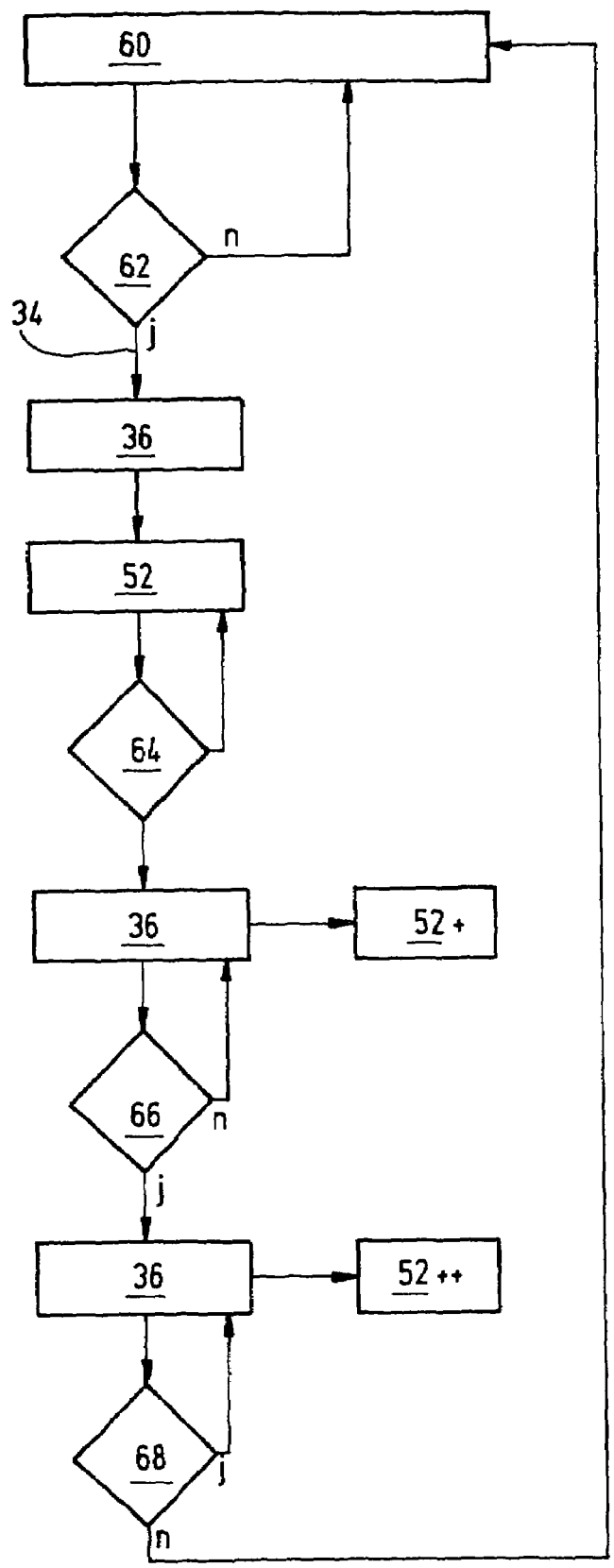
FIG. 7 shows a block diagram of the coordination of drag torque influencing as a function of a braking request for the vehicle.

A flow diagram for variation of drag torque characteristic curve 52 as a function of an actuation of the vehicle brakes is illustrated as an example in FIG. 7. Initially there is no request for a negative torque (no drag torque by the vehicle driver) according to field 60. A query 62 continually checks whether a drag torque request is present. This can be achieved by monitoring the position of the gas pedal, for example. If the position of the gas pedal is below a specifiable limit, drag torque coordinator 36 is activated by signal 34 (negative torque request). If the position of the gas pedal is not below the specifiable limit, the request remains "no drag torque" (field 60).

Drag torque coordinator 36 generates signals 38, 40, and 42, resulting in the establishment of drag torque characteristic curve 52. As shown in FIG. 6, this drag torque characteristic curve 52 is defined as a function of speed.

If the braking device is actuated during the drag torque request by the vehicle driver, so that detection may be performed, for example through a signal applied to a brake light switch, when the braking device is actuated a query 64 sends a signal to drag torque coordinator 36, which then increases the drag torque one time (field 52+). If the vehicle driver actuates the brake again (query 66), a new control signal is generated at drag torque coordinator 36 which then further increases the drag torque, either to a higher level or up to the maximum drag torque (field 52++). A query 68 constantly monitors whether a further positive torque request by the vehicle driver, for example by actuation of the gas pedal, is made. If this positive torque request is made, control of the drag torque characteristic curve is transferred in field 60 so that the drag torque is reduced by a transition function, and hybrid drive 14 is controlled corresponding to the positive torque request.

The explanations make it clear that many different drag torque characteristic curves for hybrid drive 14 may be established by drag torque coordinator 36. This may be achieved as a function of vehicle speed v and/or as a function of an actuation of the vehicle brakes. As discussed, this may involve two or more steps. Gas pedal dynamics, for example, may be taken into account as an additional control variable. The gas pedal dynamics may be derived from a gradient of a gas pedal signal, for example. Additional influencing variables may be, for example, a given roadway grade such as when traveling downhill or the like. In this case the drag torque may be adjusted in such a way that a constant speed v of the vehicle is maintained.

In summary, it is apparent that a negative torque for the operating points of hybrid drive 14 may be specified, within the physical limits of hybrid drive 14, by influencing the drag torque characteristic curve via drag torque coordinator 36. In particular, drag torque characteristic curves may be established which are independent of the rotational speed. In addition, sudden changes in torque during downshifting of transmission 30 are prevented by regulation of speed-dependent drag torque curves. Furthermore, the drag torque response of hybrid drive 14 may be taken into account during changes of the operating mode, for example internal combustion engine mode, electric motor mode, or combined internal combustion engine and electric motor mode. Lastly, a so-called coasting operation is also possible when internal combustion engine 16 is engaged in drive train 18 by electric motors 20 and/or 22 compensating for the drag torque of internal combustion engine 16.

The explanation of the exemplary embodiment was based on a parallel hybrid drive 14. Of course, the operating response of the hybrid drive may be controlled by influencing a drag torque characteristic curve for serial hybrid drives and mixed (parallel and serial) hybrid drives as well.

What is claimed is:

1. A method for controlling an operating behavior of a hybrid drive of a vehicle, the hybrid drive including an internal combustion engine and at least one electric motor, and at least one of a drive shaft of the internal combustion engine and a drive shaft of the at least one electric motor being operatively connectible to a drive train of the vehicle, the method comprising:

providing control signals for controlling the internal combustion engine and the at least one electric motor, wherein the control signals are based on a negative torque request and a transmission setting of the transmission, and wherein the control signals request a specified torque for transmission to the drive train; and setting a vehicle-speed-dependent drag torque characteristic curve for the hybrid drive by the control of the hybrid drive, in such a way that the magnitude of the drag torque is independent of the speed of the internal combustion engine and the occurrence of step-wise torques in response to shifting down of the transmission is prevented.

2. The method as recited in claim 1, further comprising:

applying a drag torque by the at least one electric motor by disengaging the internal combustion engine from the drive train.

3. The method as recited in claim 1, further comprising:

performing a coasting operation of the hybrid drive without disengaging the internal combustion engine from the drive train.

4. The method as recited in claim 1, wherein:

the drag torque characteristic curve is continuous.

5. The method as recited in claim 4, further comprising:

maximally matching the continuous drag torque characteristic curve to a maximum possible drag torque characteristic curve.

6. The method as recited in claim 1, further comprising:

determining the drag torque characteristic curve by a drag torque coordinator that provides control signals for the drive motors from a negative torque request and a gear position.

7. The method as recited in claim 6, further comprising:

providing the control signals as a function of an instantaneous speed of the vehicle.

8. The method as recited in claim 1, wherein:

the at least one electric motor includes a plurality of electric motors that are operated in at least one of a generator mode and an engine mode for influencing the drag torque characteristic curve.

9. The method as recited in claim 1, further comprising:

picking up a drag torque request by monitoring a position of a gas pedal of the vehicle.

10. The method as recited in claim 1, wherein:

the drag torque characteristic curve is influenced as a function of an additional operating parameter of the vehicle.

11. The method as recited in claim 1, further comprising: varying the drag torque characteristic curve as a function of a braking request by a vehicle driver by the targeted activation of the at least one electric motor.

12. The method as recited in claim 11, further comprising: increasing a drag torque in a stepwise manner.

* * * * *